(12) United States Patent
Sawdon et al.

(10) Patent No.: US 9,915,240 B2
(45) Date of Patent: Mar. 13, 2018

(54) METHOD AND SYSTEM FOR ENGINE AUTO-IGNITION DETECTION AND MITIGATION

(71) Applicant: GM Global Technology Operations LLC, Detroit, MI (US)

(72) Inventors: Craig M. Sawdon, Williamston, MI (US); Eric B. Ferch, Northville, MI (US); Kathryn W. McMillan, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 75 days.

(21) Appl. No.: 15/153,399

(22) Filed: May 12, 2016

(65) Prior Publication Data

US 2017/0328334 A1    Nov. 16, 2017

(51) Int. Cl.
| | |
|---|---|
| *F02P 5/00* | (2006.01) |
| *F02P 5/152* | (2006.01) |
| *F02D 13/02* | (2006.01) |
| *F02D 37/02* | (2006.01) |
| *F02D 41/30* | (2006.01) |
| *F02D 41/00* | (2006.01) |
| *F02D 41/14* | (2006.01) |

(52) U.S. Cl.
CPC .......... *F02P 5/152* (2013.01); *F02D 13/0223* (2013.01); *F02D 37/02* (2013.01); *F02D 41/0087* (2013.01); *F02D 41/1498* (2013.01); *F02D 41/3005* (2013.01)

(58) Field of Classification Search
CPC ....... F02D 37/02; F02P 5/1455; F02P 5/1526; F02P 5/00; F02P 5/151; F02P 5/152; F02P 5/1522; F02P 5/14; F02P 5/15; F02P 5/1525
USPC ............. 123/406.11, 406.14, 406.16–406.24, 123/406.29, 406.34, 406.37–406.39, 123/406.47, 406.58
See application file for complete search history.

(56) References Cited

U.S. PATENT DOCUMENTS

| | | | |
|---|---|---|---|
| 6,947,830 B1 * | 9/2005 | Froloff .................. | F02D 35/023 701/111 |
| 2009/0064762 A1 * | 3/2009 | Horner .................. | F02D 35/027 73/35.05 |

(Continued)

*Primary Examiner* — John Kwon

(57) ABSTRACT

A system and method for detecting and mitigating automatic ignition in a cylinder of an internal combustion engine. The method includes providing a first sensor for sensing and determining a crank angle of a crankshaft of the engine. A second sensor is provided for detecting a change in an engine vibration frequency caused by Auto Ignition (AI). The engine vibration signal of the second sensor is processed into a knock intensity signal. The knock intensity signal is indicative of the cylinder pressure and is acquired when the crank angle is between a first predetermined crank angle and a second predetermined crank angle. At least one characteristic of the knock intensity signal is determined and the at least one characteristic of the knock intensity signal is compared to at least one predetermined characteristic threshold. If the at least one characteristic of the knock intensity signal is determined to exceed the at least one predetermined characteristic threshold, then at least one auto ignition mitigating action is performed to mitigate the auto ignition event.

8 Claims, 4 Drawing Sheets

(56) References Cited

U.S. PATENT DOCUMENTS

| | | | |
|---|---|---|---|
| 2010/0242912 A1* | 9/2010 | Folkerts | F02D 35/023 123/435 |
| 2014/0261301 A1* | 9/2014 | Leone | F02B 17/005 123/295 |
| 2014/0261318 A1* | 9/2014 | Glugla | F02P 5/04 123/406.12 |
| 2015/0159573 A1* | 6/2015 | Glugla | F02D 41/1498 701/103 |
| 2015/0345419 A1* | 12/2015 | Glugla | F02D 35/028 123/299 |

* cited by examiner

METHOD AND SYSTEM FOR ENGINE AUTO-IGNITION DETECTION AND MITIGATION

FIELD

The present invention is related to systems and methods for controlling internal combustion engines and more particularly to systems and methods for detecting and mitigating auto-ignition events in internal combustion engines.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In a spark ignition engine, a mixture of fuel and air enters the piston combustion chamber during an intake process. The air/fuel mixture is compressed and combustion is initiated with a high energy electric spark during an ignition process.

Ignition timing impacts the performance, longevity, power, and the fuel economy of an engine. Under certain conditions uncontrolled or automatic ignitions (AI) can occur. Uncontrolled ignitions occur in spark-ignition engines when an air/fuel mixture in a cylinder is ignited by an ignition source other than spark. Generally, uncontrolled ignition that occurs before TDC is referred to Auto-Ignition (AI).

Uncontrolled ignition occurring too soon or too late in the combustion cycle is often responsible for excessive vibrations and can potentially cause engine damage due to increased cylinder temperature and pressure. Engine control systems monitor a position of a crankshaft of an engine as a means to determine crank angle. Crank angle is useful in determining when an AI event is occurring. To preserve an engine's longevity, it is important to determine when AI is occurring and take remedial action.

While detecting and mitigating systems for uncontrolled ignitions occurring after TDC are known in the art and achieve their intended purpose there still remains a need for improved detection and mitigation systems and methods. More specifically, there is a need for a new and improved detection and mitigation system identifying auto ignitions before TDC in spark ignition engines.

SUMMARY

A method for detecting and mitigating automatic ignition in a cylinder of an internal combustion engine is provided. The method includes providing a first sensor for sensing and determining a crank angle of a crankshaft of the engine. A second sensor is provided for detecting a change in an engine vibration frequency caused by Auto Ignition (AI). The engine vibration signal of the second sensor is processed into a "knock intensity" signal.

In an embodiment of the present invention, the knock intensity signal indicative of the cylinder pressure is acquired when the crank angle is between a first predetermined crank angle and a second predetermined crank angle. At least one characteristic of the knock intensity signal is determined and the at least one characteristic of the knock intensity signal is compared to at least one predetermined characteristic.

In another embodiment of the present invention, when the at least one characteristic of the knock intensity signal is determined to exceed the at least one predetermined characteristic then at least one auto ignition mitigating action is performed to mitigate the auto ignition.

In an aspect of the present invention, calculating the cylinder pressure includes converting the engine vibration signal from an analog signal to a digital signal.

In still another aspect of the present invention, calculating the cylinder pressure further includes performing a Fast Fourier Transform (FFT) on the digital signal to convert the digital signal from a time domain to a frequency domain signal, herein referred to as the "knock intensity signal".

In yet another aspect of the present invention, performing at least one auto ignition mitigating action further includes enriching a fuel flow to the cylinder when an engine speed is between a first predetermined engine speed threshold and a second predetermined engine speed threshold and an engine load is between a first predetermined engine load threshold and a second predetermined engine load threshold.

In still another aspect of the present invention, the performing of at least one auto ignition mitigating action further includes shutting off a fuel flow into the cylinder when an engine speed is between a third predetermined engine speed threshold and a fourth predetermined engine speed threshold, and the engine load is between a third predetermined engine load threshold and a fourth predetermined engine load threshold.

In yet another aspect of the present invention, the performing of at least one auto ignition mitigating action further includes adjusting an air intake camshaft position when engine speed is between a fifth predetermined engine speed threshold and a sixth predetermined engine speed threshold and the engine load is between a fifth predetermined engine load threshold and a sixth predetermined engine load threshold.

In still another aspect of the present invention, the performing at least one auto ignition mitigating action further includes preventing a short term ignition retard when engine speed is between the first predetermined engine speed threshold and a seventh predetermined engine speed threshold and the engine load is between a seventh predetermined engine load threshold and a eighth predetermined engine load threshold.

In yet another aspect of the present invention, performing at least one auto ignition mitigating action still further includes performing at least two auto ignition mitigating actions at the same time based on engine speed and engine load.

In another embodiment of the present invention, a method for detecting and mitigating auto ignition in a cylinder of an internal combustion engine includes providing a first sensor for detecting an engine vibration signal in the cylinder of the engine and calculating a knock intensity signal indicative of the cylinder pressure during a combustion cycle.

After the knock intensity signal is calculated, at least one characteristic of the knock intensity signal is determined and compared to at least one predetermined characteristic. If at least one characteristic of the knock intensity signal exceeds the at least one predetermined characteristic then at least one auto ignition mitigating action is performed to mitigate auto ignition.

Another aspect of the present invention includes providing a second sensor for measuring a crank angle of a crankshaft of the engine.

In yet another aspect of the present invention, calculating a knock intensity signal further includes reading the engine vibration signal when the measured crank angle is between a first predetermined crank angle and a second predetermined crank angle.

In still another aspect of the present invention, calculating a knock intensity signal further includes reading the engine vibration signal when the measured crank angle is between a third predetermined crank angle and a fourth predetermined crank angle.

In yet another aspect of the present invention, performing at least one auto ignition mitigating action further includes enriching a fuel flow to the cylinder when an engine speed is between a first predetermined engine speed threshold and a second predetermined engine speed threshold and an engine load is between a first predetermined engine load threshold and a second predetermined engine load threshold.

In still another aspect of the present invention, performing at least one auto ignition mitigating action further includes shutting off a fuel flow into the cylinder when an engine speed is greater than the second predetermined engine speed threshold and an engine load is greater than the second predetermined engine load threshold.

In another aspect of the present invention, performing at least one auto ignition mitigating action further includes adjusting an air intake camshaft position when engine speed is between a third predetermined engine speed threshold and a fourth predetermined engine speed threshold and the engine load is between a third predetermined engine load threshold and a fourth predetermined engine load threshold.

In yet another aspect of the present invention, performing at least one auto ignition mitigating action further includes preventing a short term ignition retard when engine speed is between the first predetermined engine speed threshold and a fifth predetermined engine speed threshold and the engine load is between a fifth predetermined engine load threshold and a sixth predetermined engine load threshold.

In still another aspect of the present invention, a system for detecting and mitigating an occurrence of automatic ignition in a cylinder of an internal combustion engine includes a first sensor operable to detect an engine vibration signal. The engine vibration signal is converted to a knock intensity signal that is indicative of a cylinder pressure in an engine. At least one signal processor is provided in communication with the first sensor operable to convert the engine vibration signal to a frequency signal referred to as a knock intensity signal.

In yet another aspect of the present invention, a controller is provided in communication with the first sensor, the at least one signal processor and the engine. The controller is operable to selectively perform at least one remedial action based on a comparison between the at least one characteristic of the knock intensity signal and a at least one predetermined characteristic.

In yet another aspect of the present invention, the system further includes a second sensor that is operable to measure a crank angle of a crank shaft of the engine.

In still another aspect of the present invention, the controller is further operable to compare the measured crank angle with at least one predetermined crank angle.

In yet another aspect of the present invention, the controller is still further operable to read the first sensor based on the comparison of the measured crank angle and the at least one predetermined crank angle.

In another aspect of the present invention, the at least one signal processor further includes an analog to digital converter operable to convert the engine vibration signal to a digital pressure signal.

In yet another aspect of the present invention, the at least one signal processor is further operable to perform a Fast Fourier Transform (FFT) on the digital pressure signal to convert the digital pressure signal to the knock intensity signal.

BRIEF DESCRIPTION OF THE DRAWINGS

The present invention will become more fully understood from the detailed description and the accompanying drawings, wherein.

DETAILED DESCRIPTION

Under some circumstances, an auto ignition (AI) event may occur within an engine cylinder. AI may be described as an event where the air/fuel mixture in the cylinder ignites before TDC and before the spark plug fires. AI can be initiated by an ignition source other than the spark, such as hot spots in the combustion chamber, a spark plug that runs too hot for the application, or carbonaceous deposits in the combustion chamber heated to incandescence by previous engine combustion events. AI can cause engine damage if not detected and not remediated.

Figure 1:
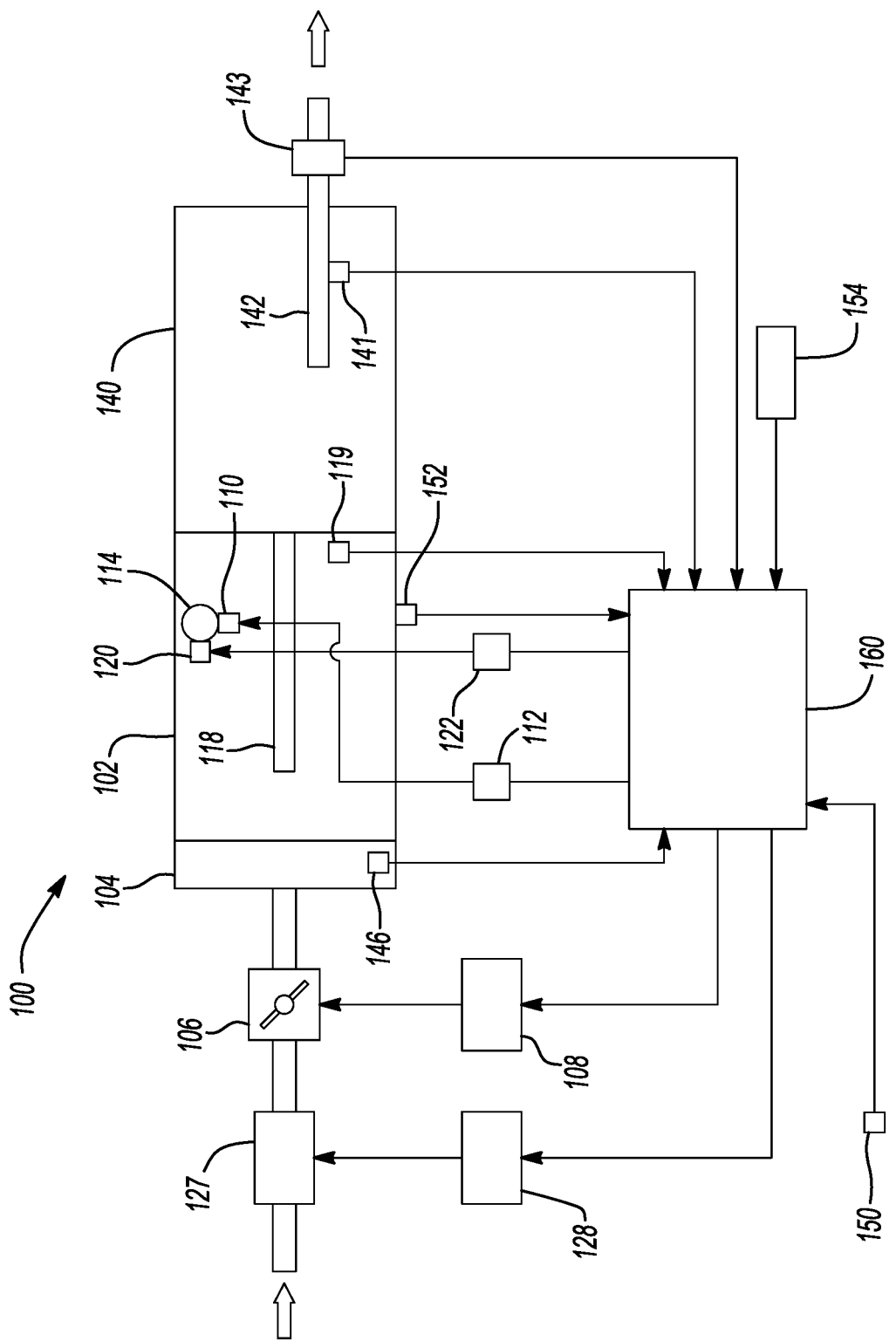
FIG. 1 is a functional diagram for a vehicle system for detecting and mitigating AI is illustrated, in accordance with the present invention.

Referring now to FIG. 1, a functional block diagram of a vehicle system 100 for detecting and mitigating AI in accordance with an embodiment of the present invention is illustrated. An engine 102 generates torque to drive the road wheels of a vehicle. Air is drawn into the engine 102 through an intake manifold 104. Airflow into the engine 102 is varied by a throttle valve 106. A throttle actuator module 108 (e.g., an electronic throttle controller) controls opening of the throttle valve 106. One or more fuel injectors, such as fuel injector 110, mix fuel with the air to form a combustible air/fuel mixture. A fuel actuator module 112 controls the fuel injector(s). The fuel injectors inject fuel directly into the cylinders or, for example, into fuel injection ports of the cylinders, respectively.

A cylinder 114 includes a piston (not shown) that is coupled to a crankshaft 118. Although the engine 102 is depicted as including only the cylinder 114, the engine 102 may include more than one cylinder, e.g., 2, 4, 6, 8 or more. One combustion cycle of the cylinder 114 may include four strokes: an intake stroke, a compression stroke, an expansion stroke, and an exhaust stroke. One engine cycle includes each of the cylinders undergoing one combustion cycle.

During the intake stroke, the piston approaches a bottom most position, and the air and fuel is provided to the cylinder 114. The bottom most position may be referred to as a bottom dead center (BDC) position. During the compression stroke, the crankshaft 118 drives the piston toward a top most position and compresses the air/fuel mixture within the cylinder 114. The top most position may be referred to as a top dead center (TDC) position. A spark plug 120 ignites the air/fuel mixture within the engine 102. A spark actuator module 122 controls the spark plug(s).

Combustion of the air/fuel mixture drives the piston away from the TDC position during the expansion stroke and rotatably drives the crankshaft 118. The rotational force (i.e., torque) is a source of compressive force for a compression stroke of a combustion cycle of one or more cylinders that follow the cylinder in a predetermined firing order. Exhaust gas resulting from the combustion of the air/fuel mixture is expelled from the cylinder 114 during the exhaust stroke.

One or more boost devices, such as a turbocharger 127 or a supercharger, may be implemented. While only one boost device is shown, multiple boost devices may be implemented. The turbocharger 127 pressurizes air within the intake manifold 104. A boost actuator module 128 controls the output of the turbocharger 127. Boost may be described as an amount that the pressure within the intake manifold 104 is greater than ambient pressure. The engine 102 outputs torque to a transmission 140. The transmission 140 may include a manual type transmission, an automatic type transmission, an auto-manual type transmission, or another suitable type of transmission.

A speed sensor 141 is disposed at or near the crankshaft 142 and is operable to determine engine speed as the crankshaft 142 spins. Additionally, the crank sensor 119 may be used to determine engine speed in addition to determining the crank angle but, for purposes of this disclosure, two separate sensors are used.

The transmission 140 outputs torque to one or more road wheels (not shown) via a transmission output shaft 142 and a driveline (not shown). A torque sensor or torque transducer 143 is located on or near the transmission output shaft 142 for sensing engine torque or load.

An electronic control module (ECM) 160 is in communication with the speed sensor 141 for receiving an engine speed signal as an input for determining engine speed, and is also in communication with the torque sensor 143 for receiving a torque signal as an input for determining engine load.

The torque sensor 143 is typically a non-contact sensor located at or near the crankshaft 142 and is operable to detect an electric or magnetic field signal that is affected by changes in engine torque on the turning crankshaft 142.

A manifold absolute pressure (MAP) sensor 146 is disposed within the intake manifold to measure pressure within the intake manifold 104 and generate a MAP based on the pressure within the intake manifold 104. A crank sensor 119 measures the rotational position of the crankshaft 118 and provides a crankshaft position signal to the ECM 160 whereby the crank angle is determined. The crank angle refers to the crankshaft 118 rotational position in relation to a piston as it travels inside of the engine cylinder 114. Measured in degrees, the crank angle for a piston that is at top dead center (TDC) of its compression stroke is 0° degree for example.

A crank angle monitoring system of the AI detection and mitigation system 100 includes ECM 160, crank sensor 119, and a toothed wheel (not shown) that rotates with the crankshaft 118. The toothed wheel may have N number of teeth, and the crank sensor 119 monitors passing of the teeth. The crank sensor 119 generates pulses in the form of a crank angle signal as the teeth of the toothed wheel pass the crank sensor 119.

The ECM 160 determines the crank angle based on the pulses in the crank angle signal. The ECM 160 determines the crank angle at various crankshaft 118 rotation intervals where AI, pre-ignition or knock is known or suspected to occur. As an example only, if used in cooperation with other sensors, the ECM 160 may determine that AI occurs during an interval between 30° and 0° before TDC of crankshaft 118 rotation.

An ambient pressure sensor 150 measures ambient (barometric) air pressure and generate an ambient air pressure based on the measured pressure. An engine vibration sensor 152 continuously measures engine vibrations that are indicative of pressure within an engine cylinder 114. In accordance with the present invention, the engine vibration sensor 152 is selectively read by the ECM 160. Additionally, in accordance with an embodiment of the present invention, the ECM 160 determines the pressure within the cylinder 114 between predetermined crank angles.

In one embodiment, the engine vibration sensor 152 is a piezoelectric accelerometer, however, other sensors commonly referred to as "knock sensors" used to detect pressure or vibration in an engine may be substituted. One or more other sensors 154 may also be implemented, such as a mass air flowrate (MAF) sensor, an intake air temperature (IAT) sensor, an oil temperature sensor, an engine coolant temperature sensor, etc.

Engine actuator modules control engine actuators based on signals from the ECM 160. For example, the throttle actuator module 108 control the throttle valve 106 based on signals from the ECM 160, the fuel actuator module 112 controls the fuel injector(s) based on signals from the ECM 160, the spark actuator module 122 controls the spark plug(s) 120 based on signals from the ECM 160, and the boost actuator module 128 controls the boost device(s) based on signals from the ECM 160. Other engine actuators, such as valve actuators, for example, may be included and controlled based on signals from the ECM 160.

AI may occur when a driver requests an increase in engine torque output following a period of operation with vacuum within the intake manifold 104 less than a predetermined value. A driver may request an increase in engine torque output following a period of operation with vacuum within the intake manifold 104 less than the predetermined value, for example, when a passing maneuver is executed, during travel on a hill, and/or under other circumstances.

During the period of operation where the vacuum within the intake manifold 104 is less than the predetermined value, combustible matter may accumulate within the cylinder 114 of the engine 102. For example, combustible matter may accumulate in crevasses of the cylinders 114 of the engine 102, such as near piston ring lands, near piston rings, near the spark plugs, etc. The associated increase in airflow into the engine 102 that occurs when the driver requests the increase in engine torque output may enable some or all of the accumulated combustible matter to combust and cause AI. In accordance with the present invention, the ECM 160 is programmed to take one or more remedial actions when AI is detected to mitigate AI. Remedial actions, include but are not limited to, cylinder fuel enrichment or shut-off, adjusting the camshaft position, and preventing short term spark retard.

Figure 2:
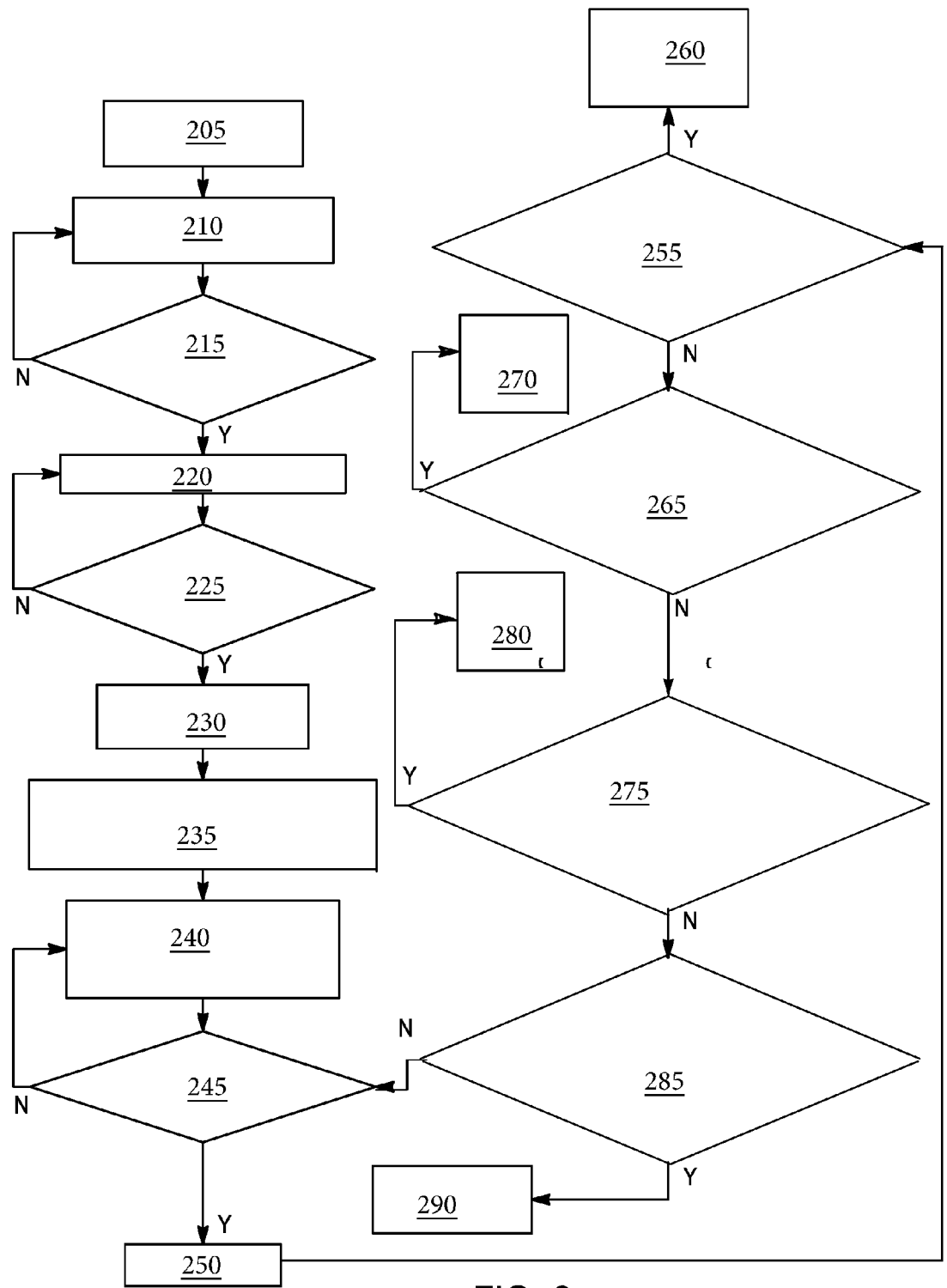
FIG. 2 is a flow diagram of a method for detecting and mitigating AI, according to the present invention.

Referring now to FIG. 2, a flow diagram of a method 200 for detecting and mitigating AI is illustrated in accordance with the present invention and starts at block 205. At block 210, ECM 160 reads the crank sensor 119 to determine the crank angle.

At block 215, ECM 160 compares the measured crank angle to a first predetermined crank angle threshold. If the measured crank angle and the first predetermined crank angle threshold are not equal then the ECM 160 continues reading the crank sensor 119. In a preferred embodiment, the crank sensor signal is continuously read by the ECM 160 such that the current crank angle is determinable. If the measured crank angle equals the first predetermined crank angle threshold then the method moves to block 220.

At block 220, the ECM 160 reads the engine vibration sensor 152 to obtain an engine vibration signal. It is appreciated that in an embodiment of the present invention, the engine vibration sensor 152 is continuously sensing the engine vibration signal and the ECM 160 reads the engine vibration signal after the measured crank angle signal is equal to the first predetermined crank angle threshold.

At block 225 the ECM 160 compares the measured crank angle to a second predetermined crank angle threshold. If the measured crank angle is not equal to the second predetermined crank angle threshold, ECM 160 continues to read the engine vibration sensor 152. If the ECM 160 determines that the measured crank angle is equal to the second predetermined crank angle threshold then the method moves to block 230.

Continuing at block 230, ECM 160 stops reading the engine vibration sensor 152. As such, the ECM 160 obtains a reading from the engine vibration sensor 152 from the first predetermined crank angle threshold to the second predetermined crank angle threshold in an engine vibration detection window.

In an alternative embodiment of the invention, the ECM 160 selectively reads the engine vibration sensor 152 during a period occurring between a third and a fourth predetermined crank angle thresholds. Following this approach, multiple cylinder pressure windows can be sensed during a cylinder combustion cycle. After the ECM 160 stops reading the engine vibration sensor 152 at block 230, the method continues at block 235.

At block 235, ECM 160 analyzes and transforms the engine vibration sensor signal that is read between the first and second predetermined crank angles thresholds. A signal read across the entire range of the engine vibration detection window may include an AI signal and a knock signal that are parsed or separated according to the time of occurrence and signal characteristics. If the AI signal ends after the knock signal starts, then a portion of the AI signal will appear at the same time the knock signal occurs. Distinct signal characteristics, such as amplitude and frequency allow for the signals to be readily identified and parsed.

In an embodiment of the present invention, the ECM 160 includes an analog to digital (AD) converter circuit (not shown) to digitize the output signal of the engine vibration sensor 152. A digital signal processor (DSP) circuit (not shown) is also included in the ECM 160 to perform the FFT on the digitized output from the (AD) circuit to identify a frequency signal or "knock intensity" signal from the digital signal.

At 240, the ECM 160 compares at least one characteristic of the knock intensity signal to at least one predetermined characteristic threshold. At block 245, if the at least one characteristic of the knock intensity signal exceeds the at least one of the predetermined characteristic threshold then the process continues to block 250. If the at least one knock intensity signal characteristic does not exceed the at least one predetermined characteristic threshold, then the method returns to block 240. In accordance with an embodiment of the present invention, the at least one predetermined characteristic used for determining if AI is occurring is the amplitude of the knock intensity signal. Alternatively, if the amplitude of the knock intensity signal transitions between a lower knock intensity minimum threshold and maximum threshold for a predetermined number of cylinder events then the present invention determines that an AI event is occurring.

At block 250, the ECM 160 initiates AI mitigation to mitigate or stop the occurrence of AI when the pressure signal parameters of the knock intensity signal exceed the at least one predetermined set of parameters. With additional reference to FIG. 3, the present invention contemplates the use one or more mitigation techniques performed separately or in combination.

Figure 3:
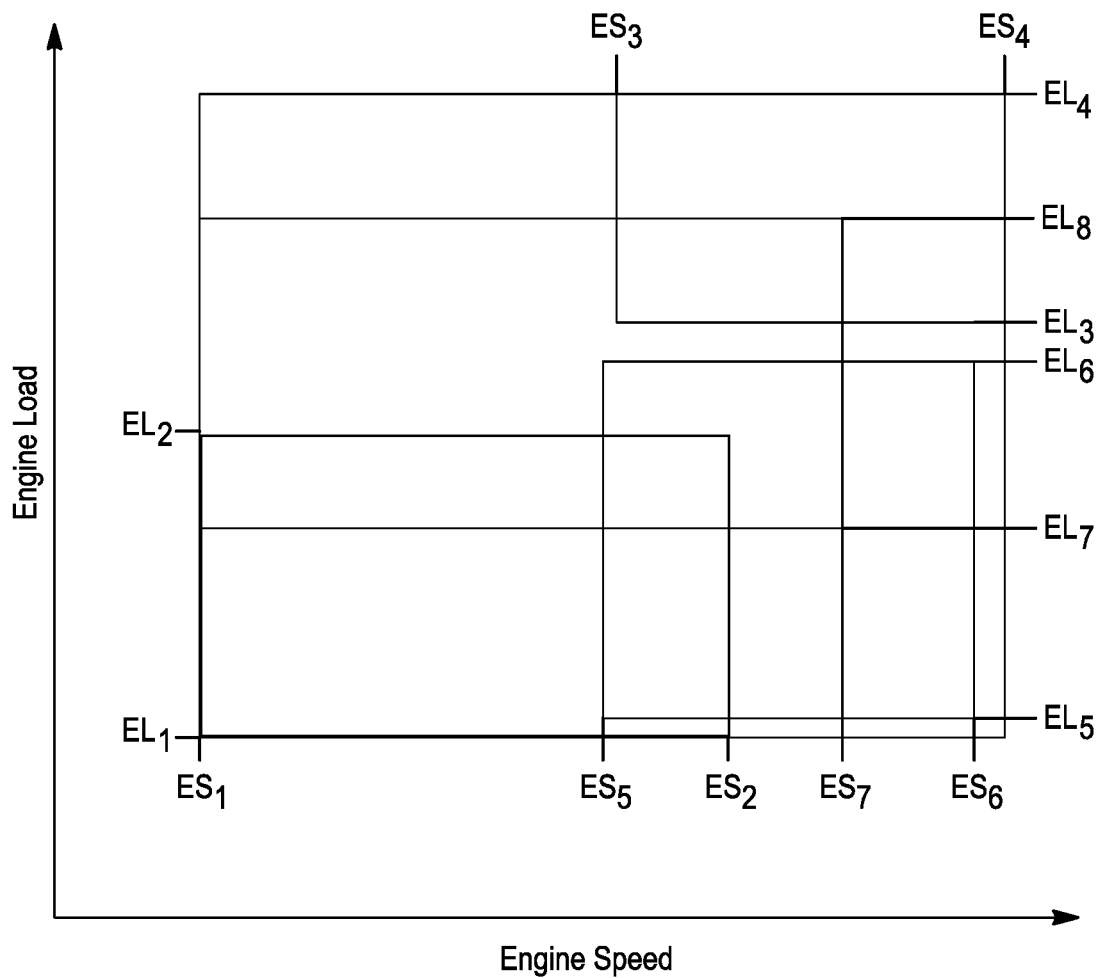
FIG. 3 is a graph illustrating multiple mitigation strategies enabled based on engine speed and engine load, in accordance with the present invention.

At block 255, the ECM 160 determines if the engine speed is between a first predetermined engine speed $ES_1$ threshold and a second predetermined engine speed $ES_2$ threshold and the engine load is between a first predetermined engine load $EL_1$ threshold and a second predetermined engine load $EL_2$ threshold (refer to FIG. 3). If the engine speed is between a first predetermined engine speed $ES_1$ threshold and a second predetermined engine speed $ES_2$ threshold and the engine load is between a first predetermined engine load $EL_1$ threshold and a second predetermined engine load $EL_2$ threshold, then at block 260, the ECM 160 causes the fuel injector 110 to inject extra fuel into the cylinder 114 thereby performing fuel enrichment mitigation.

At block 265, the ECM 160 determines if the engine speed is between a third predetermined engine speed threshold $ES_3$ and a fourth predetermined engine speed threshold $ES_4$, and if the engine load is between a third predetermined engine load threshold $EL_4$ and a fourth predetermined engine load threshold $ES_4$. If the engine speed is between a third predetermined engine speed threshold $ES_3$ and a fourth predetermined engine speed threshold $ES_4$, and if the engine load is between a third predetermined engine load threshold $ES_3$ and a fourth predetermined engine load threshold $ES_4$ then, at block 270, the ECM shuts off fuel to the engine cylinder. Enriching and removing fuel to the cylinder 114 reduces the cylinder temperature such that a temperature conducive to causing AI is avoided.

At block 275, remedial action to prevent or stop AI continues when ECM 160 determines if the engine speed is between a fifth predetermined engine speed threshold $ES_5$ and a sixth predetermined engine speed threshold $ES_6$, and if the engine load is between a fifth predetermined engine load threshold $EL_5$ and a sixth predetermined engine load threshold $EL_6$ (refer to FIG. 3). If the engine speed is between a fifth predetermined engine speed threshold $ES_5$ and a sixth predetermined engine speed threshold $ES_6$, and if the engine load is between a fifth predetermined engine load threshold $EL_5$ and a sixth predetermined engine load threshold then, at block 280, the ECM 160 performs the remedial action of adjusting the camshaft position.

Adjusting the position of the camshaft 118 affects the timing of the actuation of an engine's intake and exhaust valves which is important for controlling ignition in the engine cylinder 114. If the ECM 160 determines that the engine speed is not between a fifth predetermined engine speed threshold $ES_5$ and a sixth predetermined engine speed threshold $ES_6$, and that the engine load is not between a fifth predetermined engine load threshold $EL_5$ and a sixth predetermined engine load threshold $EL_6$ then the camshaft 118 position is not adjusted and the remedial action method continues at block 285.

At block 285, and with reference to FIG. 3, ECM 160 determines if the engine speed is between the first predetermined engine speed threshold $ES_1$ and a seventh predetermined engine speed threshold $ES_7$, and the ECM 160 determines if the engine load is between a seventh predetermined engine load threshold $EL_7$ and an eighth predetermined engine load threshold $EL_8$. If the engine speed is between the first predetermined engine speed threshold $ES_1$ and a seventh predetermined engine speed threshold $ES_7$, and if the engine load is between a seventh predetermined engine load threshold $EL_7$ and an eighth predetermined engine load threshold $EL_8$ then, at block 290, the ECM prevents short term ignition retard from occurring in the cylinder 114. If the conditions are not met then short term retard is allowed, if necessary, and the detection and mitigation method returns to block 240. Removing short term ignition retard mitigates AI by moving the spark induced combustion to be more advanced, thus cooling the charge BTDC.

Figure 4:
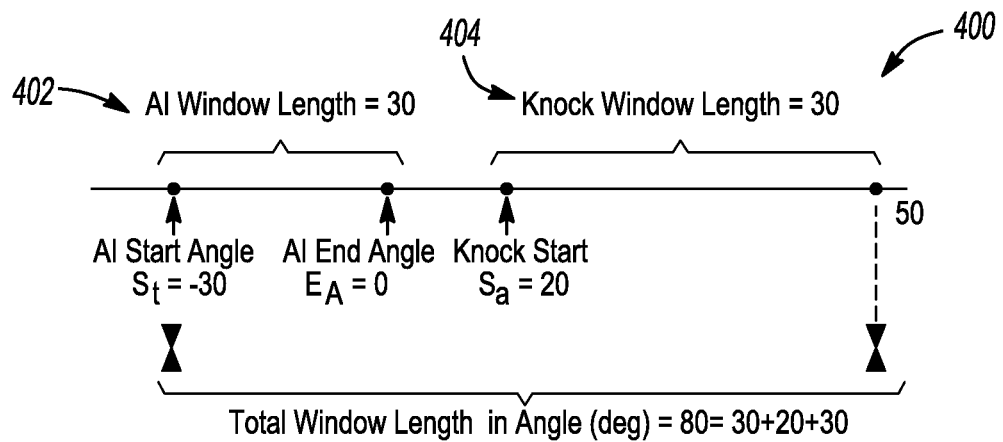
FIG. 4 is an example of a timeline graph of a crank angle window for detecting AI, in accordance with the present invention.

Referring now to FIG. 4, a crank angle degree timeline 400 includes an AI detection window 402 and a knock detection window 404 in accordance with the present invention. For example only, the total length of the crank angle degree timeline is 80° crank angle degrees. The AI detection window 402 starts at −30° crank angle degrees and ends at 0° crank angle degrees providing an AI detection window 402 length of 30° crank angle degrees.

In accordance with the present invention, ECM 160 is operable to read the pressure sensor 152 when the crank sensor 119 reads −30° crank angle degrees and to stop reading when the crank angle degrees is 50°. Therefore, the ECM 160 reads the entire crank length of 80°. Thereafter, the signal is buffered and only the AI window data between (−30° to 0°) is used for AI detection. The window length between (20° to 50°) is used to detect knock/SPI signals.

In an alternative embodiment, the ECM 160 can read one entire detection window or a plurality of distinct detection windows for obtaining the engine vibration sensor 152 signals that occur during a cylinder combustion cycle.

Figure 5:
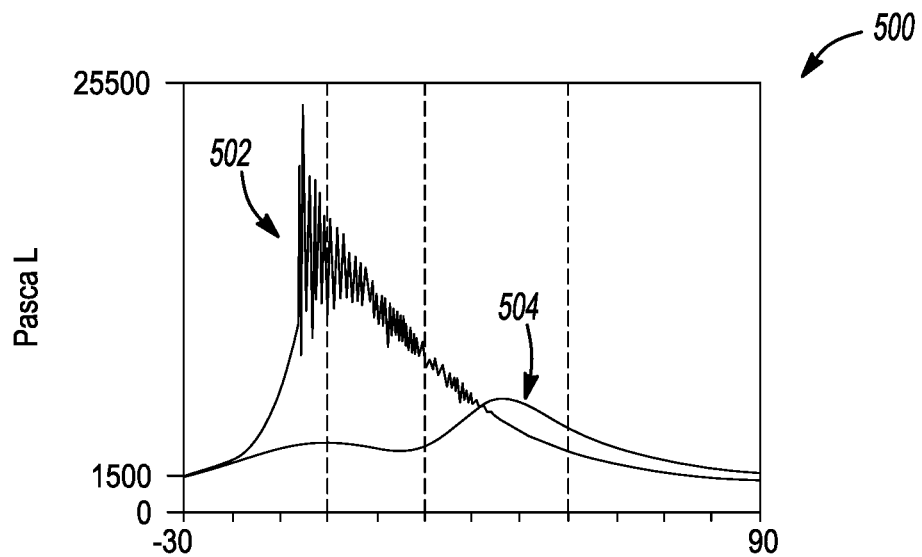
FIG. 5 is an example of a graph illustrating an AI signal overlapping a knock signal window, in accordance with the present invention.

Referring now to FIG. 5, a graph illustrating an AI signal overlapping a knock signal window is provided. The graph 500 illustrates crank angle degrees along its X axis and pressure magnitude measured in Pascals along its Y axis. For example only, in accordance with FIG. 4 above, the AI detection window 402 occurs between −30° and 0° crank angle degrees and the knock detection window is shown as occurring between 20° and 50° crank angle degrees. As illustrated, the AI pressure signal 502 begins to rise at −20° crank angle degrees to reach a maximum pressure level at approximately −5° crank angle degrees. Thereafter, the AI pressure signal 502 begins to decrease in magnitude and frequency beyond the AI detection window 402 such that it overlaps and extends through the knock detection window 404. By this example, it is notable that the knock pressure signal 504 magnitude and frequency is substantially less than the AI pressure signal 502 and is therefore easily distinguishable.

After detecting and distinguishing the AI pressure signal 502 from the knock pressure signal 504, the ECM 160 is then operable to begin remedial actions to stop or mitigate occurrences of AI whereby such uncontrolled detonations could lead to reduced engine performance and longevity or substantial engine damage.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); a discrete circuit; an integrated circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, if used above, means that some or all code from multiple modules may be executed using a single (shared) processor. In addition, some or all code from multiple modules may be stored by a single (shared) memory. In addition, some or all code from a single module may be stored using a group of memories.

The apparatuses and methods described herein may be partially or fully implemented by one or more computer programs executed by one or more processors. The computer programs include processor-executable instructions that are stored on at least one non-transitory tangible computer readable medium. The computer programs may also include and/or rely on stored data. Non-limiting examples of the non-transitory tangible computer readable medium include nonvolatile memory, volatile memory, magnetic storage, and optical storage.

What is claimed is:

1. A method for detecting and mitigating auto ignition in a cylinder of an internal combustion engine, the method comprising:
   providing a first sensor for sensing a crank angle of a crankshaft of the engine;
   providing a second sensor for detecting a knock intensity signal in the cylinder of the engine;
   determining the crank angle using the first sensor;
   calculating a knock intensity signal indicative of the cylinder pressure when the crank angle is between a first predetermined crank angle and a second predetermined crank angle;
   determining at least one characteristic of the knock intensity signal, wherein the at least one characteristic is an amplitude of the knock intensity signal;
   comparing the at least one characteristic of the knock intensity signal to at least one predetermined characteristic;
   determining if the at least one characteristic of the knock intensity signal exceeds the at least one predetermined characteristic; and performing at least one auto ignition mitigating action when the at least one characteristic of the knock intensity signal exceeds the at least one predetermined characteristic, wherein the at least one auto ignition mitigating action is selected from the group consisting of:
- (a) enriching a fuel flow to the cylinder when an engine speed is between a first predetermined engine speed threshold and a second predetermined engine speed threshold and an engine load is between a first predetermined engine load threshold and a second predetermined engine load threshold;
- (b) shutting off a fuel flow into the cylinder when an engine speed is between a third predetermined engine speed threshold and a fourth predetermined engine speed threshold, and the engine load is between a third predetermined engine load threshold and a fourth predetermined engine load threshold;
- (c) adjusting an air intake camshaft position when engine speed is between a fifth predetermined engine speed threshold and a sixth predetermined engine speed threshold and the engine load is between a fifth predetermined engine load threshold and a sixth predetermined engine load threshold; and
- (d) preventing a short term ignition retard when engine speed is between the first predetermined engine speed threshold and a seventh predetermined engine speed threshold and the engine load is between a seventh predetermined engine load threshold and a eighth predetermined engine load threshold.

2. The method of claim 1 wherein calculating a knock intensity signal further comprises converting the engine vibration signal from an analog signal to a digital signal.

3. The method of claim 2 wherein calculating a knock intensity signal further comprises performing a Fast Fourier Transform (FFT) on the digital signal to convert the digital signal to a frequency signal.

4. The method of claim 1 wherein performing at least one auto ignition mitigating action further comprises performing at least two auto ignition mitigating actions at the same time based on engine speed and engine load.

5. A method for detecting and mitigating auto ignition in a cylinder of an internal combustion engine, the method comprising:
- providing a first sensor for detecting a cylinder pressure in the cylinder of the engine;
- calculating a knock intensity signal indicative of the cylinder pressure during an engine crank cycle;
- determining at least one characteristic of the knock intensity signal;
- comparing the at least one characteristic of the knock intensity signal to at least one predetermined characteristic, wherein the at least one characteristic is an amplitude of the knock intensity signal;
- determining if the at least one characteristic of the knock intensity signal exceeds the at least one predetermined characteristic; and
- performing at least one auto ignition mitigating action when the at least one characteristic of the knock intensity signal exceeds the at least one predetermined characteristic, wherein the at least one auto ignition mitigating action is selected from the group consisting of:
  - (a) enriching a fuel flow to the cylinder when an engine speed is between a first predetermined engine speed threshold and a second predetermined engine speed threshold and an engine load is between a first predetermined engine load threshold and a second predetermined engine load threshold;
  - (b) shutting off a fuel flow into the cylinder when an engine speed is between a third predetermined engine speed threshold and a fourth predetermined engine speed threshold, and the engine load is between a third predetermined engine load threshold and a fourth predetermined engine load threshold;
  - (c) adjusting an air intake camshaft position when engine speed is between a fifth predetermined engine speed threshold and a sixth predetermined engine speed threshold and the engine load is between a fifth predetermined engine load threshold and a sixth predetermined engine load threshold; and
  - (d) preventing a short term ignition retard when engine speed is between the first predetermined engine speed threshold and a seventh predetermined engine speed threshold and the engine load is between a seventh predetermined engine load threshold and a eighth predetermined engine load threshold.

6. The method of claim 5 further comprising providing a second sensor for measuring a crank angle of a crankshaft of the engine.

7. The method of claim 6 wherein calculating the knock intensity signal further comprises reading the engine vibration signal when the measured crank angle is between a first predetermined crank angle and a second predetermined crank angle.

8. The method of claim 6 wherein calculating the knock intensity signal further comprises reading the engine vibration signal when the measured crank angle is between a third predetermined crank angle and a fourth predetermined crank angle.

* * * * *